Dec. 26, 1967  W. H. LUBIN  3,359,799
INDICATING DEVICE AND METHOD OF FILLING CONTAINERS
Filed July 29, 1965  4 Sheets-Sheet 4
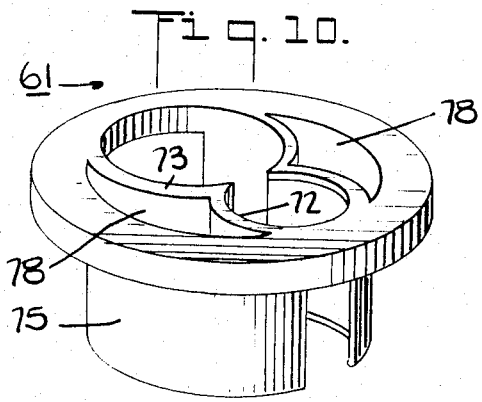
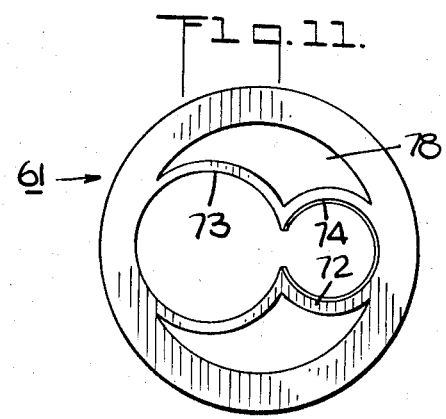
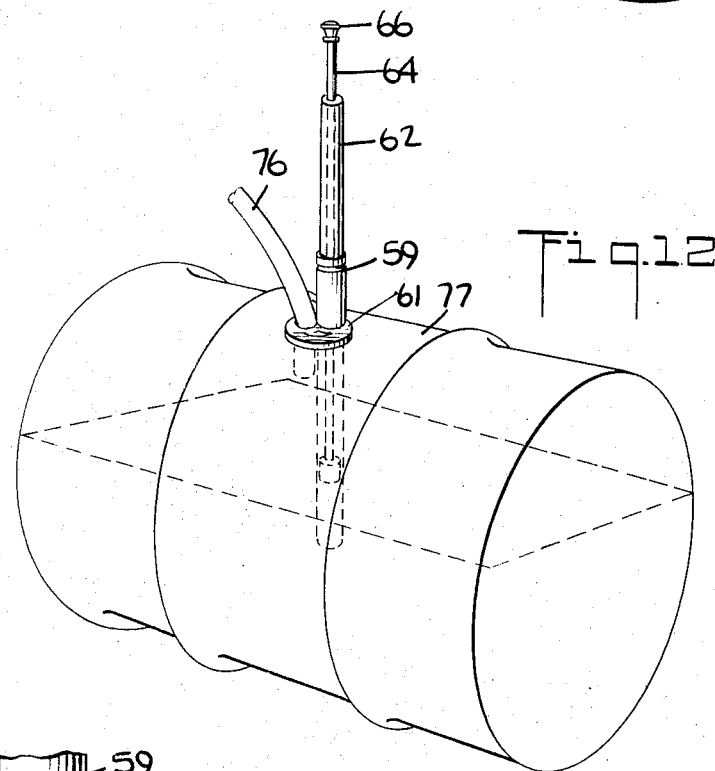
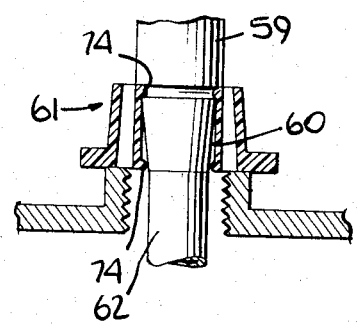
INVENTOR.
WILLIAM H. LUBIN
BY
ATTORNEYS United States Patent Office 3,359,799
Patented Dec. 26, 1967

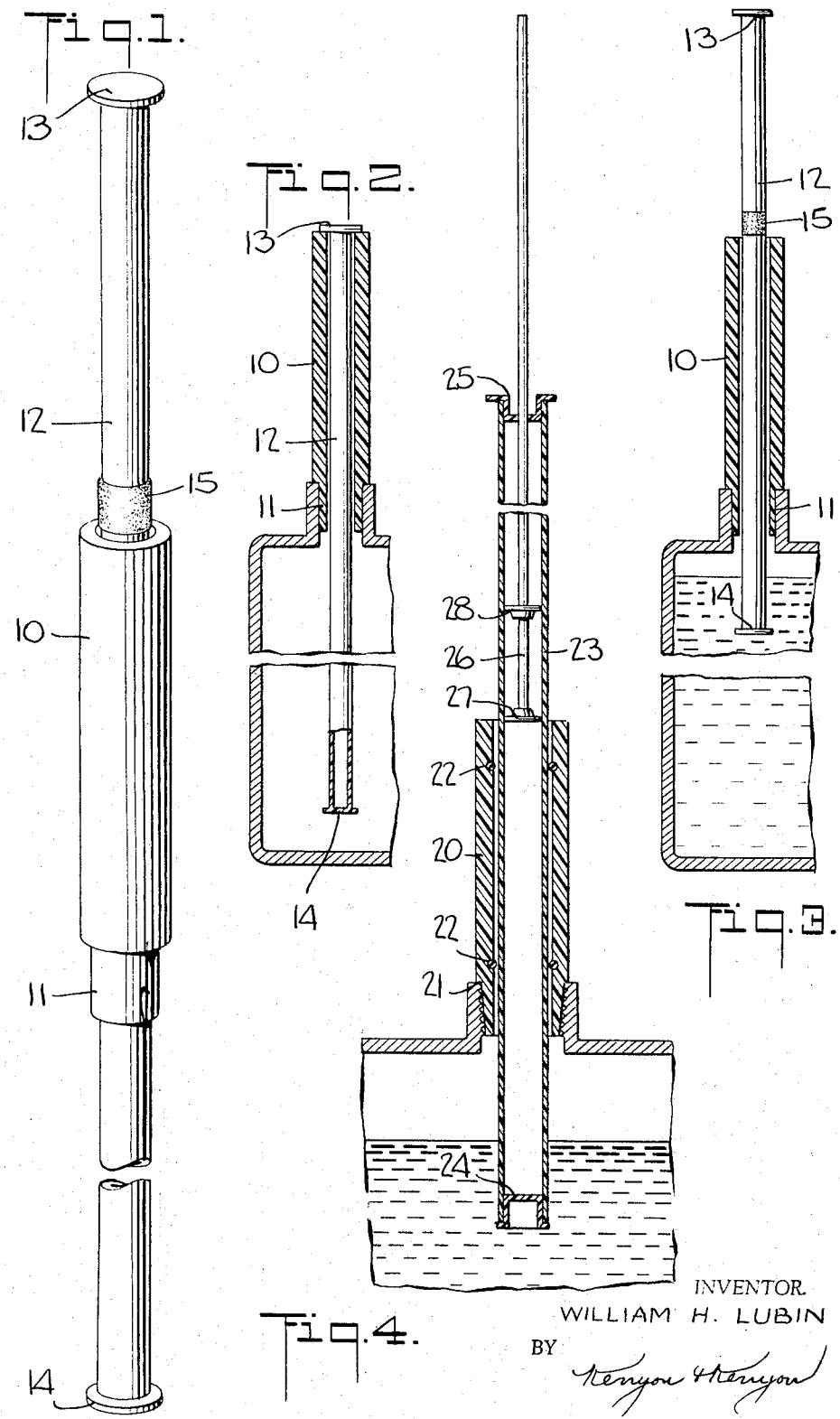

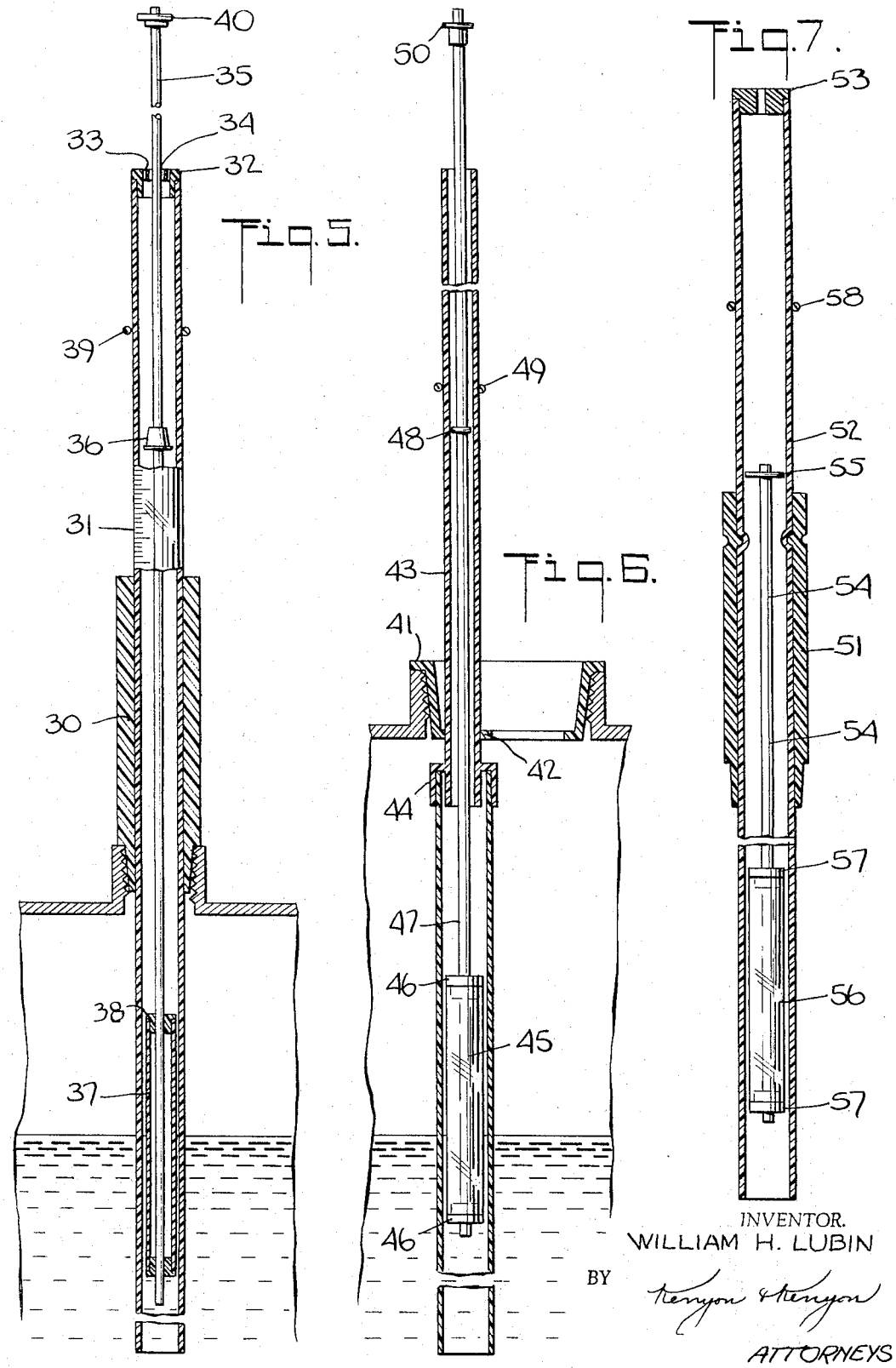

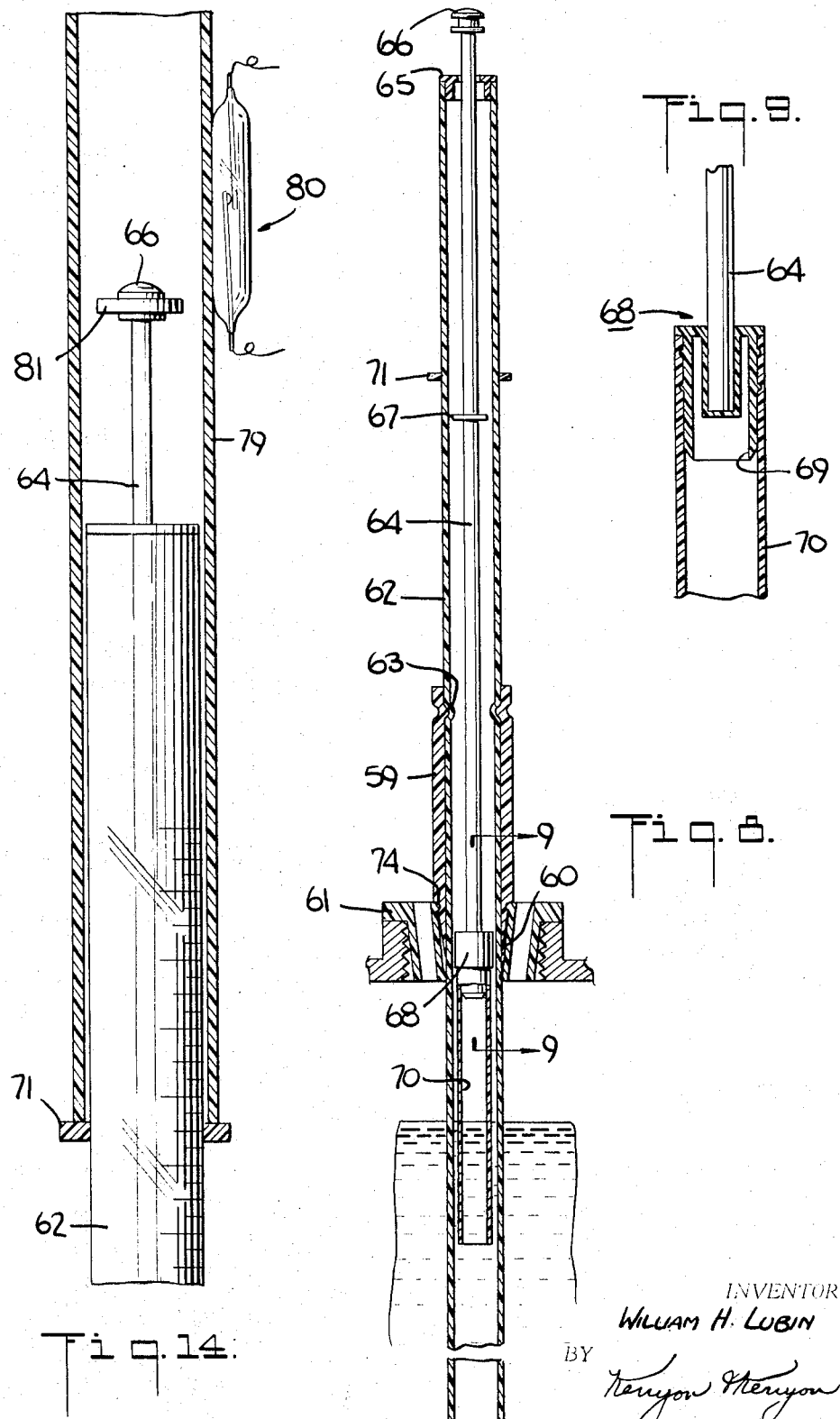

3,359,799
INDICATING DEVICE AND METHOD OF
FILLING CONTAINERS
William H. Lubin, 22 Silver Spring Road,
West Orange, N.J. 07052
Filed July 29, 1965, Ser. No. 478,024
13 Claims. (Cl. 73—308)

This application, is a continuation-in-part of application Ser. No. 393,180, filed Aug. 31, 1964, now abandoned.

This invention relates to a novel device for indicating the level of material in a container as the container is being filled or emptied. More particularly, this invention relates to an indicating device for filling containers to a desired level on an assembly line basis.

In filling containers, bottles, steel drums, etc. to a desired level, it is customary to place the container upon a scale and to fill the container to a desired weight. This operation is repeated for each container that is filled. In some instances the container can be filled to a particular level without the necessity of weighing the container by filling to a level marked on the outside of the container. However, this procedure can only be followed where the container is constructed of a transparent or translucent material. Where the container is made of a material which does not permit the contents to be visually seen from the outside, then it is essential that the container be weighed prior to shipment, or else overfilled so as to insure the proper weight. In the first instance, a time consuming operation is involved particularly where the containers are filled on an assembly line basis. In the second instance a considerable economic loss is involved in view of overfilling the containers.

It is therefore a primary object of this invention to provide a device which permits a container to be filled to a desired level without the necessity of weighing each container.

It is another object of this invention to provide a method for filling containers on an assembly line basis without the necessity for weighing each container.

It is a further object of this invention to provide a device which indicates the level of a material in containers having liquids of different densities.

It is still a further object of this invention to provide a device which indicates the level of material in a container as the container is being emptied.

It is a still further object of this invention to provide a device which may serve as a permanent level indicator in a fixed vessel or tank.

It is a still further object of this invention to provide a device for filling a container to a desired level with a switch means to stop the filling of the container at that desired level.

These and other objects of this invention will become apparent from the detailed description and drawings.

FIG. 1 is a perspective view of a device of this invention.

FIGS. 2 and 3 are cross-sectional views showing the operation of the device of FIG. 1.

FIG. 4 is a cross-sectional view of an embodiment of this invention.

FIG. 5 is a cross-sectional view of a preferred embodiment of this invention.

FIG. 6 is a cross-sectional view of another embodiment of this invention.

FIG. 7 is a cross-sectional view of another preferred embodiment of this invention.

FIG. 8 is a cross-sectional view of another preferred embodiment of this invention.

FIG. 9 is a view taken at line 9—9 of FIG. 8.

FIG. 10 is a perspective view of a support ring which supports the indicating device in a container.

FIG. 11 is a plan view of the support ring illustrated in FIG. 10.

FIG. 12 is a view of a device of this invention positioned in a container at a point in the filling operation.

FIG. 13 is a part cross-sectional view of the support ring of FIG. 10 in an alternate position with respect to a container.

FIG. 14 is a cross-sectional view of an embodiment of this invention illustrating a switch device in cooperation with an indicating device.

Referring now to FIG. 1 of the drawings, there is provided a support tube 10 open at each end and having at the lower end a shoulder or band 11 which fits snugly into the opening in the top of a container. The support tube is constructed with a diameter such that a float tube 12 sealed at both ends 13 and 14 is slidably disposed therein. At least one end of the float tube is flanged such that its diameter or end is greater than the diameter of the bore of the support tube 10. This prevents the float tube from slipping out through the guide tube during use. A reference mark 15 is placed upon the float tube during operation, as described below.

Reference should now be had to FIGS. 2 and 3, FIG. 2 shows the device positioned in an empty container and FIG. 3 shows the device when the container has been filled to the desired level.

In operation, the end of the support tube containing the shoulder or band is inserted in an opening in the top of the container which may have more than one opening in the top thereof and which may be constructed of any type material such as plastic or steel and may be of any capacity. The shoulder 11 of the support tube fits snugly into the opening or else abuts upon the container opening. The container is then filled to the desired weight or volume by placing it upon a scale. As the container is filled with the material, the float tube rises with the level of the material until the container is filled with the desired weight or volume. At this point a reference mark 15 is made on the float tube at a point where the tube meets the top of the support tube. Any number of similar containers of equal shape and volume can be filled with the same amount of liquid at the same ambient temperature merely by transferring the device from one drum to the next and filling the container to the same reference level as that marked on the float tube. This procedure eliminates the necessity of having to weigh each container to insure proper weight or of having to rely on visual estimates of level or having to overfill the container in order to insure having the proper weight therein.

A further modification of the device of this invention is shown in FIG. 4. This indicator has a support tube 20 having a shoulder 21 which abuts upon the opening of the container or press fits into the threaded opening in the drum or tank. The support tube contains on the inside thereof two O-rings 22 preferably made of Teflon which serve as low friction bearings in which the float tube 23 slides. The float tube has a loose fit in the O-rings to allow for venting. The O-rings are inserted in grooves (not shown) in the support tube. In place of the O-rings, ball bearings or other conventional bearing means may be substituted. The float tube has a lower plug 24 which has a diameter slightly larger than that of the tube itself. The upper end of the tube has a removable friction fit plug 25 which has a wide flange to prevent the tube from falling through the support tube and which supports marker 26 disposed in the float tube and which comprises a thin rod having at the lower end a plug which serves as a reference marker 27 and an upper marker 28 which serves as an advance warning marker. The reference marker is fixed at the lower end of the rod 26 whereas the advance warning marker is adjustable on the rod and may be moved to any desired position depending upon the warning desired. Marker 26 is manually adjusted as will be described below.

In operation the support tube is inserted in the opening of the container such that it either fits tightly in the mouth or else abuts upon the mouth of the opening. The container is placed on scale and filled with the desired weight or volume of material. As the container is filled, the float tube rises in the container. Once the container is filled with the desired weight, the marker adjustment rod 26 is moved such that the lower reference marker 27 is in alignment with the top surface of the support tube. The indicator is then removed from the container and other containers of the same shape and volume are filled at the same ambient temperature to the point where the level reference marker is in alignment with the top of the support tube. As the container is being filled, the float tube rises in the support tube such that the advance warning marker 28 appears prior to the level reference marker 27. The advance warning marker advises the operator that the end point at which the filling operation will be discontinued is aproaching. The distance between the advance warning marker and the level reference marker may be adjusted to the convenience of the operator simply by moving the advance warning marker to the desired distance. The marker adjustment rod may of course be moved to any desired point in the tube depending upon the particular volume or weight of liquid to be filled in the container and upon the density of the particular material being filled in the container.

As will be seen from the above, the float tube in both of these modifications is generally considerably longer in length than the support tube and is freely slidable therein. One or both ends of the tube may be flanged depending upon the particular configuration desired.

Another modification of this invention is shown in FIG. 5 of the drawing. This indicator has a support tube 30 which has a shoulder which is adapted to abut upon an opening of the container or to press-fit into an opening in the container. Disposed within the support tube is a guide tube 31. The upper end of the guide tube contains a press-fitted plug 32 having vent holes 33 disposed around the periphery thereof and an opening 34 in the middle thereof through which a rod 35 is slidably disposed. Rod 35 is preferably slightly longer in length than guide tube 31 and has level marker 36 disposed thereon. A float tube 37 containing press-fitted plugs 38 at either end of the float tube 37 and whose length is substantially less than that of the guide tube is disposed at the bottom end of rod 35. Plugs 38 are preferably flanged in order to provide a limited bearing area but do not interfere with the slidable movement of the float tube 37 in the guide tube 31. A slidable reference ring 39 is disposed about the outer surface of guide tube 31 which may contain a graduated reference scale on the inner surface thereof if desired. The upper end of rod 35 contains a stop 40 which limits the downward movement of the rod.

In operation the support tube is inserted in the opening of the container such that it either fits tightly in the mouth of the container or else abuts upon the mouth of the opening. The container is placed on a scale and filled with material to the desired weight or volume. As the container is being filled the float tube rises in the guide tube along with the level marker 36. Once the container is filled to the desired weight or volume, the slidable reference ring 39 is adjusted such that it is in alignment with the level marker 36. The indicator is then removed from the container and other containers of the same shape and volume are filled with the same material at the same ambient temperature to the point where the slidable reference ring 39 and level marker 36 are in alignment. The reference scale printed on the guide tube permits resetting the reference ring to a predetermined level.

Reference should now be had to FIG. 6 of the drawings which shows an embodiment of this device particularly designed for containers which have but one opening. In this embodiment a flanged support ring 41 is placed in the opening in the container. The bottom portion of the support ring has an extension 42 extending across a small part of the bottom portion of the ring. Guide tube 43 is disposed in an opening in the extension 42. Guide tube 43 has an upper portion and a lower portion. The upper portion has a much narrower diameter than the lower since it is essential that there be room enough in the mouth of the container for both the indicator and a hose nozzle from which the container will be filled. The bottom end of the guide tube is open. The guide tube may be a unitary piece or the lower portion of the guide tube 43 may be joined to a plug or extension 44 at the lower end of the upper guide tube. Float tube 45 is slidably disposed in the lower portion of the guide tube. Float tube 45 contains press-fitted plugs 46, preferably flanged so as to provide a limited bearing area. These plugs are inserted in either end of the tube. Each plug contains an opening in the center thereof through which a float rod 47 is fitted. The float rod is preferably slightly longer in length than the length of the guide tube and has a marker ring 48 thereon. An adjustable reference ring 49 is placed around the outer surface of the upper guide tube. A stop 50 is placed at the upper end of the float rod to limit its downward movement.

In operation the support ring is placed in the mouth of the container and a hose or other device for filling the container is also inserted in the mouth. As the container is being filled, float tube 45 rises in the lower guide tube. When the container is filled to the desired weight or volume the adjustable ring 49 is brought into alignment with the marker ring 48 on the float rod 47. The indicator is then removed from the mouth of the container and placed in the mouth of another container and that container filled until the marker ring 48 and reference ring 49 are in alignment.

Reference should now be had to FIG. 7 for a preferred modification of this invention. This indicator has a support tube 51 which has a shoulder adapted to abut upon the opening of a container or to be press-fitted into an opening of a container. Support tube 51 is superimposed upon guide tube 52 and fixed by crimping both tubes so as to lock them together. This crimp also provides a stop for the float assembly to be described below. The top of the guide tube contains a press-fitted plug 53 having a vent opening. Disposed within the guide tube is a float road 54 which has a marker 55 at the top thereof and a float tube 56 at the lower end thereof. Float tube 56 contains press-fitted plugs 57 at each end. Plugs 57 have an opening in the middle thereof so that the float rod 54 may be inserted therethrough. The top of the float rod 54 containing the marker 55 is disposed above the anular crimp in the support tube and guide tube such that the marker 55 is retained by or abuts upon the annular crimp in the guide tube thereby limiting its downward movement. A slidable reference ring 58 surrounds the upper part of the guide tube.

In operation the support tube is placed in the mouth of a container to be filled with the guide tube extending down into the container. As the container is filled with material, the float tube rises in the guide tube until the container is filled with the desired weight or volume of material. At this point filling of the container is discontinued and the slidable reference ring 58 is brought into alignment with marker 55. The container is then removed from the scale and the indicator is inserted in another container of the same shape and volume and that container filled with the material until the marker 55 is in alignment with the reference ring 58.

Referring to FIG. 8, the indicator has a support tube 59 which is provided with a suitable tapered portion 60 which is designed to fit a standard ¾ inch bung and which is capable of being press-fitted into a flanged support ring 61. The support tube 59 is superimposed upon guide tube 62 and fixed thereto by crimping both tubes. The crimp also forms a stop shoulder 63 on the interior wall of the guide tube 62 to stop the float tube 70 described below. The top of the guide tube 62 is provided with a vent plug 65 press-fitted therein. This vent plug 65 is formed with an enlarged central aperture through which the float rod 64 passes.

The float rod 64 has an enlarged stop button 66 at its upper end which is larger in diameter than the aperture in the vent plug 65 so as to arrest downward movement of the float rod 64. The float rod 64 is also provided with a suitable level marker 67 which is affixed thereto at a point intermediately thereof which lies in a plane above the plane of the stop shoulder 63 when the stop botton 66 abuts the vent plug 65. The float rod is further provided with a seal plug 68 on the lower end thereof.

As shown in FIG. 9, the seal plug 68 is press-fitted on the float rod 64. The seal plug 68 is of a diameter which is slightly less than the diameter of the bore of the guide tube 62. The seal plug 68 has a concentric depending cylindrical portion 69 to which is press-fitted a hollow float tube 70. The portion 69 is provided with a plurality of beads which are adapted to mate with complementary grooves in the float tube 70 so that a leak-proof fit is obtained. The float tube 70 is concentrically spaced from the guide tube 62 and extends at its lowermost position to within a slight distance of the end of the guide tube 62, for example, three-sixteenths of an inch. Because the float tube 70 is within the guide tube 62, it is protected from the turbulence and the direct flow of the material filling the container in which the diameter is mounted.

As in the above emobdiments, the guide tube 62 is provided with a reference ring 71 for similar purposes.

As shown in FIGS. 10 to 12, the support or adaptor ring 61 is provided with a pair of overlapping bores, one of smaller diameter than the other formed by walls 72, 73. The smaller bore permits the tapered portion 60 of the indicator support tube 59 to be press-fitted therein while the larger bore allows a filling nozzle to be passed therethrough into the interior of a container. The mouths of the smaller bore are provided with a bead or lip 74, the uppermost of which fits into a mating groove in the upper end of the tappered portion 60 of the support tube 59 to provide a substantially secure fit. The wall 75 of the support or adapter ring 61 is tapered to fit and be held with sufficient force within a range of sizes of bung openings in various containers. The support ring 61 thus permits simultaneous filling by a suitable hose 76 and gauging by the indicating device of a container 77 having only one opening (see FIG. 12). The support ring 61 is further provided with a pair of vents 78 which are formed between the walls 72, 73 of the bores and wall 75. The vents 78 permit the release of any back pressure which may build up upon filling of a container.

Referring to FIG. 13, the support or adaptor ring 61 is reversible to permit its use with a container having an opening of a diameter between the size opening of the wall 75 and the tapered portion 60 of the support tube 59. When used in the reversed position, the lowermost lip 74 on the wall 72 which is slightly tapered snaps into the mating groove of the tapered portion 60 of the support tube 59 guide tube 62 on such a container.

An automatic flow control switch can be mounted in the indicating devices, for instance, on the adjustable reference ring, in order to provide an automatic means for discontinuing the flow of filling material into the containers. The control switches which can be suitably used are hermetically sealed in order to allow their use in explosive atmospheres. The switches can be connected to an external relay which would control a solenoid operated valve to shut off the flow when a predetermined level is reached in the container being filled.

Referring finally to FIG. 14, a switch mounting tube 79 provided with a suitable limit switch means 80, such as, a proximity switch sealed in glass, is mounted over the guide tube 62 and supported on the reference ring 71. Alternatively, the switch mounting tube 79 can be press-fitted on the guide tube 62 in which case the bottom of the tube 79 can serve as the reference ring. The limit switch means 80 can be fastened to the side of the guide tube or alternatively, it can be adjustably mounted on the guide tube by any suitable means. The float rod 64 is provided with a suitable switch actuating means 81, such as a bar magnet.

In operation the float rod 64 moves upwardly in the mounting tube 79 under the influence of the contained filling material to a position whereat the switch actuating means 81 is in proper position to actuate the switch means 80. At that position the switch means 80 is actuated to open the holding circuit of a magnetic contactor or relay which in turn would close a solenoid valve in the filling line feeding the filling nozzle means (not shown) to shut off further flow of filling material into the container. The switch means could also be used to actuate an alarm signal such as a buzzer or lamp. In order to resume flow, the contactor or relay would be manually reset by a switch (not shown) which could be mounted on the mounting tube for convenience to the operator.

It is noted that any suitable limit switch means and switch actuating means can be used with the indicating devices of this invention. For example, a mercury switch can be positioned in the switch mounting tube on a suitable pivot and be actuated by the head of the float rod to shut off the flow of filling material into the container or to operate an alarm signal.

The indicating device of the invention can utilize two or more reference marker rings for the blending of two or more liquids in a container, such as a drum or tank, thus eliminating the need for weighing or metering each liquid component of the blended mixture.

In operation, the rings are set to the levels which indicate the desired proportions for the desired mixture. With the indicating device set in place in the container, the first liquid is introduced into the container until the level indicator reaches the first reference marker, the second liquid is then introduced until the indicator reaches the second reference marker and so on until the mixture is complete.

In addition to filling containers on an assembly line basis to a desired level, the indicator of this invention may also be used as a permanent level indicator in a fixed vessel or tank where the vessel is periodically emptied and then filled to the same level. The procedure in this operation is the same as that described above except that the tank is stationary. In operation the tank is filled with a liquid to the desired level and that level marked on the guide or float tube of the indicator. The material is then withdrawn from from the tank and the tank refilled to the same level.

The indicator of this invention can also be used to measure the level of material in a container as the container is being emptied. This may be accomplished by making the guide tube or float tube long enough to reach the bottom of the container. As the container is being emptied by means of a pump, spigot or other means, depending upon the particular embodiment of this invention employed, the level of material in the container will decrease and the float assembly will fall in like manner thereby indicating the level of material in the container.

In addition to the embodiments of this invention disclosed above, it is apparent that numerous others will be obvious to those skilled in the art. For example, the float or guide tubes may contain a graded reference scale marked on the tube itself. Likewise the guide or float tube may have referenced marks in different colors marked thereon. This feature is particularly desirable where the indicator is to be used to fill the same type of container to different levels, or to fill different size containers, or for use in containers with materials of different densities. The guide tube may be threaded so that it may be screwed into the opening in the container if desired.

The indicator of this invention is preferably a plastic material such as polyethylene, polypropylene or Teflon. The choice of materials for the indicator will depend upon the materials to be filled in the containers. In instances where greater chemical resistance is desired, materials like Teflon will be chosen. Any suitable material may be used for the indicator. It is only essential that the float tube have a specific gravity less than that of the material being filled in the container so that it will rise in the support tube or guide tube as the material being filled in the container rises in the container.

Having thus provided a written description of the present invention and provided specific examples thereof, it should be understood that no undue restrictions or lamitations are to be imposed by reason thereof but that the present invention is defined by the appended claims.

What is claimed is:

1. A device for indicating the level of material in a container comprising a first tube open at both ends thereof, plug means positioned in one end of said first tube and having an aperture therethrough, a float tube slidably disposed in said first tube below said plug means, and means associated with said float tube for indicating the level of material in the container, said means including a float rod extending upwardly from said float tube through said plug means, an enlarged stop on the upper end of said float rod of larger dimensions than the aperture in said plug means for arresting downward movement of said float rod, a level marker affixed on said float road intermediately thereof and a reference ring slidably mounted on the periphery of said first tube for indicating a determined level of material in a container.

2. A device as set forth in claim 1 wherein said float tube is open at the lower end thereof and concentrically spaced from said first tube.

3. A device as set forth in claim 1 which further comprises a support tube having a tapered portion thereon for insertion in an opening of a container, said support tube supporting said first tube therein.

4. A device as set forth in claim 3 wherein a crimp secures said support tube and first tube together.

5. A device as set forth in claim 3 which further comprises a flanged support ring having a pair of bores therein, one of said bores being smaller in diameter than the other of said bores, said one of said bores having a bead around the mouth at each end thereof and wherein said support tube includes a groove therein in mating engagement with one of said beads.

6. A device as set forth in claim 1 wherein said float tube is sealed at the lower end thereof.

7. A device as set forth in claim 1 which further comprises a switch means mounted on said reference ring at a first position for producing a signal, whereby a flow of material into the container is shut off, said switch means being actuated upon movement of said enlarged stop into a position coincident with said first position.

8. A device as set forth in claim 7 wherein said switch means comprises a limit switch and said enlarged stop includes a limit switch actuating means thereon for actuating said limit switch.

9. A device as set forth in claim 7 wherein said switch means comprises a proximity switch and said enlarged stop includes a bar magnet mounted thereon for actuating said proximity switch.

10. A device as set forth in claim 1 wherein said float tube is sealed at both ends.

11. A device as set forth in claim 1 which further comprises a support tube having a shoulder at the bottom thereof, said first tube being disposed in said support tube for support therein.

12. A device for indicating the level of material in a container having only one opening comprising a flanged support ring having a pair of bores therein one of said bores being smaller in diameter than the other of said bores, said one of said bores having a bead around the mouth at each end thereof, a support tube positioned in said support ring and having a groove therein in mating engagement with one of said beads, a guide tube positioned in said support tube, a float tube slidably disposed in said guide tube, and means associated with said float tube for indicating the level of material in the container.

13. A device as set forth in claim 12 wherein said support ring is reversible whereby said groove in said support ring is adapted to mate with the other of said beads.

References Cited

UNITED STATES PATENTS

| | | | |
|---|---|---|---|
| 219,584 | 9/1879 | Koch et al. | 73—322 |
| 509,170 | 11/1893 | Johnson | 73—319 |
| 1,263,451 | 4/1918 | Martin | 73—322 X |
| 1,908,196 | 5/1933 | Talbot | 73—322 |
| 2,784,273 | 3/1957 | Binford | 200—84.3 |
| 3,023,620 | 3/1962 | Hoferer | 73—309 |
| 3,136,295 | 6/1964 | Gramo | 73—294 X |

FOREIGN PATENTS

| | | |
|---|---|---|
| 1,283,561 | 12/1961 | France. |
| 955,031 | 4/1964 | Great Britain. |
| 640,296 | 3/1962 | Italy. |

LOUIS R. PRINCE, *Primary Examiner.*

DANIEL M. YASICH, *Assistant Examiner.*

UNITED STATES PATENT OFFICE
CERTIFICATE OF CORRECTION

Patent No. 3,359,799  December 26, 1967

William H. Lubin

It is hereby certified that error appears in the above numbered patent requiring correction and that the said Letters Patent should read as corrected below.

Column 4, line 60, for "anular" read -- annular --;
column 5, line 69, after "59" insert -- to support the --;
column 6, line 59, strike out "from", second occurrence;
column 7, line 34, for "dimensions" read -- dimension --.

Signed and sealed this 28th day of January 1969.

(SEAL)
Attest:

Edward M. Fletcher, Jr.
Attesting Officer

EDWARD J. BRENNER
Commissioner of Patents